United States Patent
Yamada

(10) Patent No.: US 8,977,414 B2
(45) Date of Patent: Mar. 10, 2015

(54) TRAIN CONTROL SYSTEM

(71) Applicant: The Nippon Signal Co., Ltd., Tokyo (JP)

(72) Inventor: Takeshi Yamada, Kuki (JP)

(73) Assignee: The Nippon Signal Co., Ltd., Tokyo (JP)

(*) Notice: Subject to any disclaimer, the term of this patent is extended or adjusted under 35 U.S.C. 154(b) by 0 days.

(21) Appl. No.: 14/227,515

(22) Filed: Mar. 27, 2014

(65) Prior Publication Data

US 2014/0214248 A1 Jul. 31, 2014

Related U.S. Application Data

(63) Continuation of application No. PCT/JP2012/074518, filed on Sep. 25, 2012.

(30) Foreign Application Priority Data

Sep. 30, 2011 (JP) .................... 2011-216711

(51) Int. Cl.
*G05D 3/00* (2006.01)
*G05D 1/00* (2006.01)
*B61L 3/00* (2006.01)
(Continued)

(52) U.S. Cl.
CPC ............ *B61L 3/008* (2013.01); *B60L 15/40* (2013.01); *B61L 23/34* (2013.01); *B61L 27/0005* (2013.01); *B61L 15/0027* (2013.01); *Y02T 90/16* (2013.01)
USPC ........................................ 701/20

(58) Field of Classification Search
CPC .. B61L 27/0005; B61L 15/0027; Y02T 90/16
USPC ........................................ 701/20
See application file for complete search history.

(56) References Cited

U.S. PATENT DOCUMENTS 8,295,993 B2* 10/2012 Kumar .................... 701/2
8,676,410 B2* 3/2014 Houpt et al. ............. 701/19
(Continued)

FOREIGN PATENT DOCUMENTS

JP 08-002416 A 1/1996
JP 09-076915 A 3/1997
(Continued)

OTHER PUBLICATIONS

Machine Translation of JP 2002-012150, Yagi Makoto.*

*Primary Examiner* — Mary Cheung
*Assistant Examiner* — Frederick Brushaber
(74) *Attorney, Agent, or Firm* — Foley & Lardner LLP

(57) ABSTRACT

A train control system of the present invention includes: an on-board device 1 that is mounted on a train and has an vehicle radio set VRS1 capable of performing wireless communication; fixed radio sets (WRS1 to WRS7, and SRS1) that are disposed along the railroad track R and capable of performing wireless communication by a time division multiple access method with the vehicle radio set VRS1; and a ground device 2 that calculates distance from a train A to a stop point before a preceding train B on the basis of the location information of the train A obtained by the wireless communication between the vehicle radio set VRS1 and the fixed radio set. The on-board device 1 generates a stop pattern on the basis of the distance, and performs a travel control so that the train A travels at a speed equal to or less than the stop pattern.

4 Claims, 3 Drawing Sheets

(51) Int. Cl.
  *B60L 15/40* (2006.01)
  *B61L 23/34* (2006.01)
  *B61L 27/00* (2006.01)
  *B61L 15/00* (2006.01)

(56) References Cited

U.S. PATENT DOCUMENTS

| | | | |
|---|---|---|---|
| 8,725,325 B1 * | 5/2014 | Nishinaga et al. | 701/20 |
| 2007/0046220 A1 * | 3/2007 | Alton et al. | 318/52 |
| 2007/0078574 A1 * | 4/2007 | Davenport | 701/19 |
| 2007/0152107 A1 * | 7/2007 | LeFebvre et al. | 246/169 R |
| 2008/0071435 A1 * | 3/2008 | Katzer | 701/20 |
| 2009/0173840 A1 * | 7/2009 | Brown et al. | 246/1 R |
| 2009/0299555 A1 * | 12/2009 | Houpt et al. | 701/19 |
| 2010/0191395 A1 * | 7/2010 | Rosenkranz et al. | 701/19 |
| 2011/0098908 A1 * | 4/2011 | Chun | 701/117 |
| 2011/0118899 A1 * | 5/2011 | Brooks et al. | 701/2 |

FOREIGN PATENT DOCUMENTS

| | | |
|---|---|---|
| JP | 09-193805 A | 7/1997 |
| JP | 2002-012150 A | 1/2002 |
| JP | 2002-067957 A | 3/2002 |
| JP | 2002-249047 A | 9/2002 |

* cited by examiner

TRAIN CONTROL SYSTEM

This application is a continuation application of PCT/JP2012/74518, filed on Sep. 25, 2012.

BACKGROUND OF THE INVENTION

1. Technical Field

The present invention relates to a train control system which performs travel control of a train and more specifically, relates to a train control system capable of making trains travel while narrowing train intervals.

2. Description of Related Art

Conventionally, a train control system which performs travel control of trains is known. As this type of a train control system, for example, a train control system disclosed in Japanese Laid-open (Kokai) Patent Application Publication No.2002-67957 is known. The train control system is configured that, for example, block sections are provided by dividing a traveling rail (track) of a train at intervals of several hundred meters and travel control of trains is performed in each of the block sections.

SUMMARY OF INVENTION

However, in the conventional train control system, a train travel control is performed in each of block sections. In general, a length of one block section is set to several hundred meters, so that the distance (train interval) between a train and a preceding train cannot be shortened less than one block interval, so that the train interval is long.

Therefore, taking the above-described existing problems into consideration, an object of the invention is to provide a train control system capable of performing train travel control while narrowing the train interval.

In order to achieve the object, a train control system according to an aspect of the present invention includes: an on-board device which is mounted on a train traveling on a railroad track and has an vehicle radio set capable of performing wireless communication; a fixed radio set which is disposed along the railroad track and capable of performing wireless communication with vehicle radio set by a time division multiple access method, in which time synchronization is performed to allow each of the vehicle radio sets and the fixed radio sets to communicate with each other only in an allocated time slot; and a ground device which calculates distance from the train to a stop point before the preceding train on the basis of the location information of the train obtained by the wireless communication between the vehicle radio set and the fixed radio set, and the on-board device generates a stop pattern from the train on which the on-board device is mounted to the stop point on the basis of the distance to the stop point, which is transmitted from the ground device, and performs a travel control so that the train on which the on-board device is mounted travels at a speed equal to or less than the stop pattern.

The train control system according to an aspect of the present invention has a configuration of performing the travel control of the trains so that the train travels at a speed equal to or less than the stop pattern generated on the basis of the distance from the train on which the on-board device is mounted to the stop point just before the preceding train, which is obtained by wireless communication by the time division multiple access method between the fixed radio set and the vehicle radio set. Consequently, the train can be traveled to the stop point just before the preceding train. By properly setting the location of the stop point, the interval to the preceding train (the train interval) can be narrowed while maintaining safety.

DESCRIPTION OF THE PREFERRED EMBODIMENTS

Hereinbelow, an embodiment of the present invention will be described with reference to the accompanying drawings.

Figure 1:
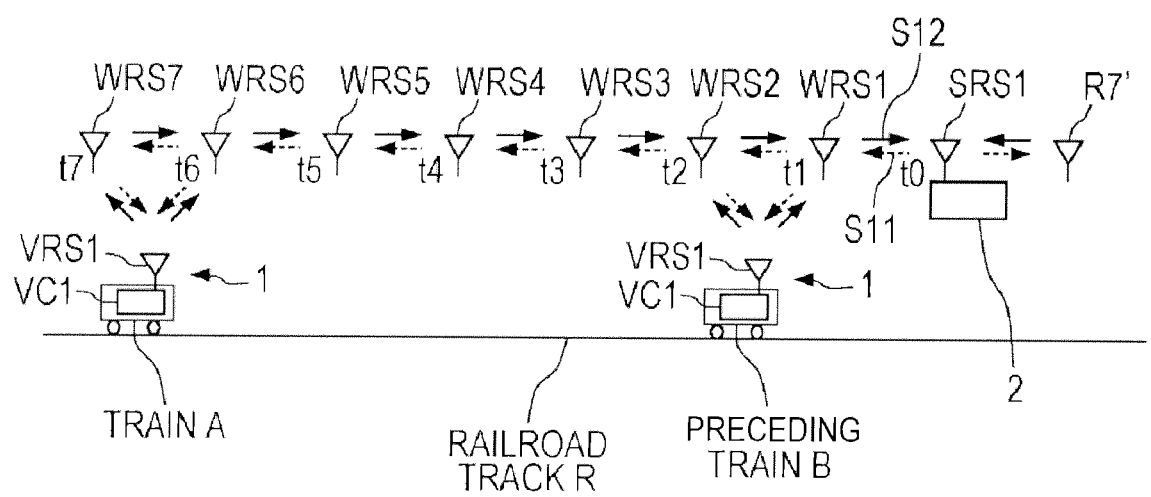
FIG. 1 is a block diagram illustrating an embodiment of a train control system according to the present invention.

FIG. 1 is a block diagram illustrating an embodiment of a train control system according to the present invention.

In FIG. 1, a train control system 10 of the embodiment performs a train travel control and includes on-board device 1 having a vehicle radio set VRS1, a plurality of wayside radio sets WRS1 to WRS7, a station radio set SRS1, and a ground device 2. In the embodiment, the station radio set SRS1 and the wayside radio sets WRS1 to WRS7 correspond to fixed radio sets according to the present invention.

The on-board device 1 is mounted on a train traveling on a railroad track R, performs travel control on a train on which the on-board device 1 is mounted, and the on-board device 1 detects the location of the train and includes, for example, the vehicle radio set VRS1 and the on-board device body VC1.

The vehicle radio set VRS1 can wirelessly communicate various information among the plurality of wayside radio sets WRS1 to WRS7 and the station radio set SRS1 while traveling and the vehicle radio set VRS1 is connected to the on-board device body VC1.

The on-board device body VC1 is connected to the vehicle radio set VRS1 by, for example, a wired cable, performs travel control of the train on which the on-board device 1 is mounted on the basis of various information received by the vehicle radio set VRS1, and detects the train location of the train on which the on-board device 1 is mounted.

The on-board device body VC1 detects the train location of the train on which the on-board device 1 is mounted by wireless communication between the vehicle radio set VRS1 and the fixed radio sets (WRS1 to WRS7 and SRS1) and transmits information of the train location to the ground device 2 via the vehicle radio set VRS1 and the fixed radio sets (WRS1 to WRS7 and SRS1). The location information of a train A transmitted to the ground device 2 is used to calculate the distance from the train A to a stop point (refer to FIG. 2) before a preceding train B.

Specifically, the on-board device body VC1 measures the distance (distance measurement) between a fixed radio set and the vehicle radio set VRS1 by propagation delay time of an radio wave in transmission and reception of wireless communication between the vehicle radio set VRS1 and the fixed radio set, detects the train location of the train on which the on-board device 1 is mounted on the basis of, for example, the distance measurement result and location information of each of the wayside radio sets preliminarily stored in the on-board device body VC1, and transmits the information of the train location to the ground device 2 via each of the fixed radio sets.

Figure 2:
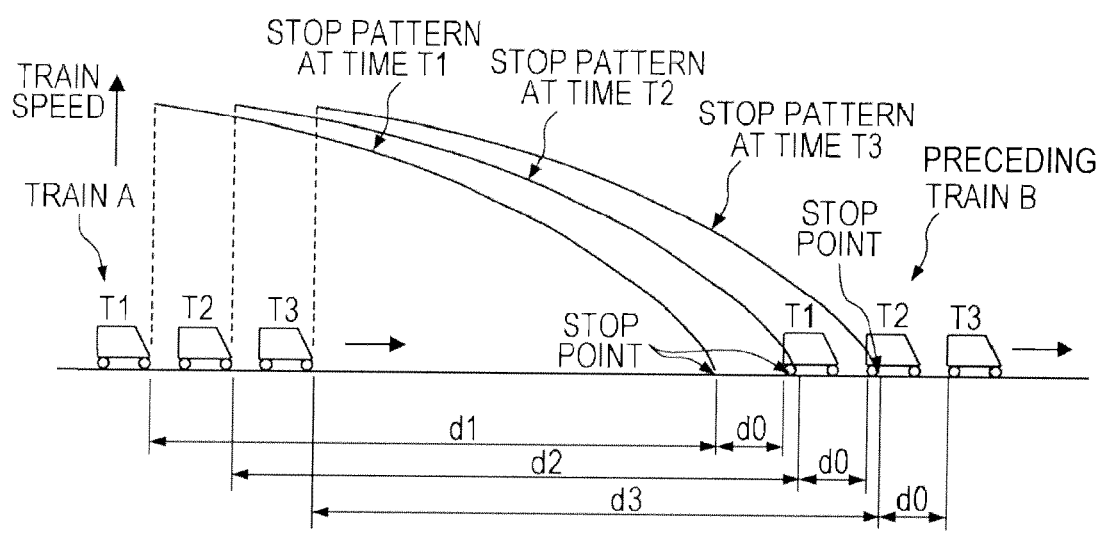
FIG. 2 is an explanatory diagram explaining travel control of a train in the train control system of the embodiment.

The on-board device body VC1 generates a stop pattern (refer to FIG. 2) from the train A on which the on-board device 1 is mounted to the stop point on the basis of the distance to the stop point transmitted from the ground device 2, and performs travel control so that the train A travels at speed equal to or less than the stop pattern. The stop pattern is a pattern of speed until the train A reaches the stop point to be stopped, and, for example, as illustrated in FIG. 2, the stop pattern is a pattern in which the train speed decreases as the train approaches the stop point and is zero at the stop point.

The station radio set SRS1 is installed at in a base station, for example, it is connected to the ground device 2 by a wired cable, wirelessly transmits, to the wayside radio set, control information and a control instruction from the ground device 2 to a train and a wayside radio set, and wirelessly receives, from the wayside radio set, information from the train and the wayside radio set to the ground device 2.

The wayside radio sets WRS1 to WRS7 transmit to and receive from the vehicle radio set VRS1 and the station radio set SRS1 various information. The plurality of the wayside radio sets WRS1 to WRS7 is spatially separated and arranged along a railroad track R which is a moving route of the train, and the plurality of the wayside radio sets WRS1 to WRS7 are propagation type radio sets, in which adjacent wayside radio sets wirelessly communicate with each other to transmit information by relaying the information. Each of the wireless communications between the fixed radio sets (WRS1 to WRS7, and SRS1) and the vehicle radio set VRS1 is performed by the time division multiple access (TDMA) method which will be described later.

The ground device 2 calculates the distance from the train A to the stop point before the preceding train B on the basis of the location information of the train obtained by the wireless communication between the vehicle radio set VRS1 and the fixed radio set, and transmits the information of the calculated distance to the stop point to the on-board device body VC1 via the vehicle radio set VRS1, the station radio set SRS1 and the plurality of wayside radio sets WRS1 to WRS7. In the embodiment, as illustrated in FIG. 2, the stop point is located at a position which is set in front of the rear end of the preceding train B by preset allowance distance d0.

The ground device 2 also has the function of controlling and managing communication of the vehicle radio set VRS1, the station radio set SRS1, and the plurality of wayside radio sets WRS1 to WRS7, and thus, the ground device 2 controls and manages communication of each of the radio sets so as to perform a communication by the time division multiple access (TDMA) method in which time synchronization is performed to allow each of the vehicle radio sets and the fixed radio sets to communicate with each other only in an allocated time slot.

Figure 3:
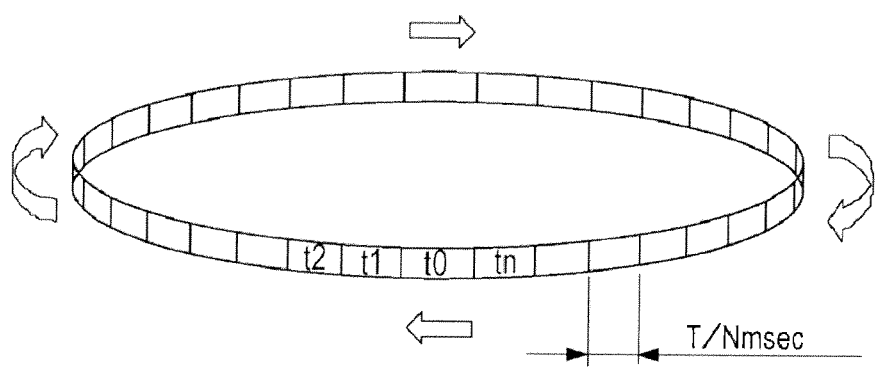
FIG. 3 is an explanatory diagram illustrating time slots allocated to fixed radio sets and vehicle radio sets in wireless communication in the embodiment.

A network (TDMA network) of wireless communication among the radio sets (VRS1, WRS1 to WRS7, and SRS1) configured as described above is controlled in a manner in which, as illustrated in FIG. 3, one transmission can be done in T/N (ms), that is, time obtained by dividing one period T (msec) by N pieces. For example, sequence numbers such as $t_0, t_1, t_2, \ldots, t_n$ are assigned to the N pieces of unit times. After the last number $t_n$, $t_0$ follows. The numbers are repeated in such a manner. $t_0, t_1, t_2, \ldots, t_n$ are expressed as $t_i$ ($0 \le i \le N-1$) as a general form. $t_i$ is called a time slot, and i is called time slot number. N denotes the number of time slots. For example, one period T (msec) is set to 500 msec, the number N of time slots is set to 256, and one time slot T/N is set to about 2 msec. The period T, the number N of time slots, and the time slot T are not limited to those values but can be variously set.

One period T of the wireless communication network (TDMA network) is, for example, constructed by being sectioned to a distance measurement block for measuring distances between the vehicle radio set VRS1 and two wayside radio sets WRS selected by the ground device 2, a VRS transmission block in which the vehicle radio set VRS1 is a transmission source, a synchronization block for synchronizing transmission and reception operations of the radio sets, and the like. Each block is made by predetermined number of time slots.

The ground device 2 also has the function of selecting a fixed radio set to be provided for radio transmission and reception for measuring the distance to the vehicle radio set VRS1. For example, the ground device 2 recognizes the initial location of a train, recognizes the train location in a real-time manner so as to follow the travel of the train on the basis of information of the train location from the on-board device 1, and selects the closest two fixed radio sets which are located in the backward and forward directions of the vehicle radio set VRS1, as a distance measurement radio set pair provided for transmission and reception for measuring distance to the vehicle radio set VRS1. The ground device 2 transmits, for example, a distance measurement instruction to the selected distance measurement radio set pair and the vehicle radio set VRS1 via the station radio set SRS1 and the wayside radio set. For example, as illustrated in FIG. 1, in the case in which the train A is located between the wayside radio set WRS6 and the wayside radio set WRS7, the ground device 2 selects WRS6 and WRS7 as the distance measurement radio set pair, and transmits a distance measurement instruction to the distance measurement radio set pair (WRS6 and WRS7) and the vehicle radio set VRS1 mounted on the train A.

Next, in the train control system 10 of the embodiment, the operation of detecting the train location and the operation of travel control will be described with reference to FIGS. 1 to 3. As illustrated in FIG. 1, the location detection and travel control of the train A in the case in which the train A is traveling between the wayside radio sets WRS6 and WRS7 and the preceding train B is traveling between the wayside radio sets WRS1 and WRS2 will be described. Since the travel control of the preceding train B is performed on the basis of the location of the train (not illustrated) ahead of the preceding train B in a manner similar to that of the train A, a description thereof will be omitted. The following description is based on assumption that the ground device 2 recognizes that the train A is traveling between the wayside radio sets WRS6 and WRS7 on the basis of the previous train location information transmitted from the on-board device 1.

First, the operation of detecting the train location will be described.

The ground device 2 selects WRS6 and WRS7 as the closest two wayside radio sets located in the backward and forward directions of the vehicle radio set VRS1 mounted on the train A, and generates a distance measurement instruction for the distance measurement radio set pair (WRS6 and WRS7) and the vehicle radio set VRS1 mounted on the train A. The ground device 2 selects WRS1 and WRS2 as the closest two wayside radio sets located in the backward and forward directions of the vehicle radio set VRS1 mounted on the preceding train B, and generates a distance measurement instruction for the distance measurement radio set pair (WRS1 and WRS2) and the vehicle radio set VRS1 mounted on the preceding train B. The distance measurement instruction generated by the ground device 2 is transmitted to the station radio set SRS1 via a wired cable. When time is a transmission time slot allocated to the station radio set SRS1, the station radio set SRS1 transmits the received distance measurement instruction by wireless communication to the first wayside radio set WRS1, and the second wayside radio set WRS2 receives the distance measurement instruction in the same time slot. When time is a transmission time slot allocated to the second wayside radio set, the second wayside radio set transmits the received distance measurement instruction by wireless communication to the third wayside radio set WRS adjacent to the second wayside radio set. Hereinbelow, transmission and reception is similarly performed among the wayside radio sets so that the information is sequentially relayed and transmitted to the wayside radio set at the end of the control area of the network.

As illustrated in FIG. 1, each of the wayside radio sets WRS1 to WRS7 and the vehicle radio set VRS1 executes an instruction when the transmitted instruction includes an instruction to itself. Since instructions to the vehicle radio set VRS1 mounted on the train A and the distance measurement radio set pair WRS6 and WRS7, are included, in a predetermined time slot in a distance measurement block, the vehicle radio set VRS1 and the distance measurement radio set pair WRS6 and WRS7 execute wireless communication for distance measurement. The on-board device body VC1 mounted on the train A measures distances between the radio sets (WRS6-VRS1, WRS7-VRS1) on the basis of propagation delay time of radio waves for distance measurement, and detects the train location of the train A on which the vehicle radio set VRS1 is mounted on the basis of the distance measurement result and the location information of the wayside radio sets preliminarily stored in a storage (not illustrated). The vehicle radio set VRS1 mounted on the train A transmits train location information of the train A on which the vehicle radio set VRS1 is mounted in a time slot for transmission allocated to the vehicle radio set VRS1. The train location information is received by a wayside radio set positioned closest to the vehicle radio set VRS1. The wayside radio set which received the train location information transmits the received train location information to the station radio set SRS1 in the time slot for transmission allocated to the wayside radio set. The transmitted train location information is sequentially relayed by the wayside radio sets existing between the station radio set SRS1 and the wayside radio set in a time division manner as described above, and is transmitted to the ground device 2 via the station radio set SRS1 and the wired cable. In such a manner, the transmission direction of information from the ground device 2 and that of information from the train are opposite to each other.

Sine instructions to the vehicle radio set VRS1 mounted on the preceding train B and the distance measurement radio set pair WRS1 and WRS2, are included, the vehicle radio set VRS1 mounted on the preceding train B and the distance measurement radio set pair WRS1 and WRS2 executes wireless communication for distance measurement in a predetermined time slot in the distance measurement block. The on-board device body VC1 mounted on the preceding train B detects the train location of the preceding train B on the basis of the distance measurement results between the radio sets (WRS1-VRS1, WRS2-VRS1) and location information of the wayside radio sets preliminarily stored in a storage. The on-board device body VC1 mounted on the preceding train B transmits the information of the detected train location to the ground device 2 via the fixed radio sets. For example, as illustrated in FIG. 2, when the train A and the preceding train B travel, the on-board device body VC1 detects the train location of the train A on which the on-board device body VC1 is mounted and the preceding train B at times (T1, T2, T3, . . . ) in a real-time manner, and transmits the train location information to the ground device 2 via the radio sets (the vehicle radio set and the fixed radio set) as necessary.

Next, the operation of the travel control of the train will be described.

The ground device 2 calculates the distance from the train A to the stop point just before the preceding train B on the basis of the train location information transmitted via the fixed radio sets from the on-board devices 1 mounted on the train A and the preceding train B. In a manner similar to the distance measurement instruction, the ground device 2 transmits the information of the calculated distance to the stop point to the on-board device body VC1 via the station radio set SRS1, the plurality of wayside radio sets WRS1 to WRS7, and the vehicle radio set VRS1.

The on-board device body VC1 generates a stop pattern (refer to FIG. 2) from train A on which the on-board device body VC1 is mounted to the stop point on the basis of the distance to the stop point transmitted from the ground device 2, and performs travel control so that the train A travels at a speed equal to or less than the stop pattern. The on-board device body VC1 sets, for example, the allowance distance d0 to be shorter than the conventional one fixed block section length (for example, hundreds meters) and performs a travel-control so that the train A is allowed to travel close to the rear end of the preceding train B to be stopped. The on-board device body VC1 generates stop patterns at times (T1, T2, T3, . . . ) on the basis of the distance information at the times. As described above, the stop pattern is updated as necessary on the basis of the distance to the preceding train.

The train control system 10 according to the embodiment has a configuration of performing the travel control of the trains so that the train travels at a speed equal to or less than the stop pattern generated on the basis of the distance to the stop point just before the preceding train, which is obtained by wireless communication by the time division multiple access method between the fixed radio set and the vehicle radio set. Consequently, the train can be traveled to the stop point just before the preceding train. By properly setting the position of the stop point, the interval to the preceding train (the train interval) can be narrowed while maintaining safety.

In the embodiment, it has been described that the train location is detected by the on-board device and the train information is transmitted from the on-board device 1 to the ground device 2. However, the invention is not limited to the embodiment. For example, each train location may be detected on the ground device and the train location information based on the detection result may be transmitted from the ground device 2 to the on-board device 1 mounted on each train.

Although the embodiment has been described that the number of wayside radio sets is seven, obviously, the number of wayside radio sets installed is not limited to seven. For example, the number of wayside radio sets can be increased and decreased in accordance with the length of the control target area of the ground device 2.

It should be noted that the entire contents of Japanese Patent Application No. 2011-216711, filed on Sep. 30, 2011, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A train control system comprising:
an on-board device that is mounted on each train traveling on a railroad track and has a vehicle radio set configured to perform wireless communication;
a plurality of fixed radio sets disposed along the railroad track and configured to perform wireless communication with the vehicle radio set, wherein adjacent fixed radio sets of the plurality of fixed radio sets wirelessly communicate with each other to transmit information by relaying the information; and a ground device configured to transmit information to and receive information from the on-board device of each train via the fixed radio sets, wherein the ground device calculates each distance between each train and a position that is set before a rear end of a preceding train thereof by an allowance distance, based on location information of each train, and transmits information including distance information to the fixed radio sets;

wherein the on-board device of each train generates a stop pattern based on the distance information and performs a travel control of the train on which the on-board device is mounted, when the information, which has been received from the ground device via each fixed radio set and which includes the distance information, includes an instruction to the vehicle radio set of the on-board device.

2. The train control system according to claim 1, wherein the on-board device detects a location of the train on which the on-board device is mounted based on propagation time of radio waves propagating between the train and two fixed radio sets respectively located in front of and behind the train, and transmits the location information of the train to the ground device via the vehicle radio set and the fixed radio sets.

3. The train control system according to claim 1, wherein the on-board device of each train generates the stop pattern from the train on which the on-board device is mounted to a position that is set before a rear end of a preceding train thereof by the allowance distance, based on distance information which has been received from the ground device via the fixed radio sets, and performs a travel control so that the train travels at a speed equal to or less than the stop pattern.

4. The train control system according to claim 1, wherein the wireless communication between the plurality of fixed radio sets and the on-board device is performed by time division multiple access, in which time synchronization is performed such that the fixed radio sets and the on-board device communicate with each other only in an allocated time slot.

* * * * *